United States Patent [19]
Morisawa

[11] Patent Number: 4,628,372
[45] Date of Patent: Dec. 9, 1986

[54] METHOD AND APPARATUS FOR IDENTIFYING RECORDED INFORMATION SEGMENTS ON A RECORD MEDIUM

[75] Inventor: Takashi Morisawa, Chiba, Japan

[73] Assignee: Sony Corporation, Tokyo, Japan

[21] Appl. No.: 632,963

[22] Filed: Jul. 20, 1984

[30] Foreign Application Priority Data

Jul. 21, 1983 [JP] Japan ................................. 58-133226

[51] Int. Cl.$^4$ ....................... G11B 5/09; G11B 15/18
[52] U.S. Cl. ....................................... 360/40; 360/43; 360/72.2
[58] Field of Search ................... 360/40, 43, 48, 72.2, 360/44; 369/28

[56] References Cited
U.S. PATENT DOCUMENTS

| | | | |
|---|---|---|---|
| 3,597,752 | 8/1971 | Eldert et al. | 360/40 |
| 3,633,190 | 1/1972 | Morsing | 360/40 |
| 3,732,364 | 5/1973 | Terada | 360/40 |
| 3,760,388 | 9/1973 | Schmitz et al. | 360/40 |

Primary Examiner—Vincent P. Canney
Attorney, Agent, or Firm—Lewis H. Eslinger; Alvin Sinderbrand

[57] ABSTRACT

Program segments on a magnetic tape are identified by recording patterns of continuous sine wave signal bursts and blank portions in non-recorded spaces between the program segments, the continuous sine waves all having the same low-frequency relative to the audio frequency band and a selected number of continuous sine waves and a corresponding blank portion of the same length each form one level of a binary signal and a second burst of continuous sine waves and a corresponding blank portion of the same length each form the other level of the binary signal. These four elements are arranged to provide an individual address code for each of the program segments on the magnetic tape and are arranged such that they may be read in either direction of tape travel, in order to identify the program segment from either direction, by forming the address code signals as complementary pairs based upon the location of the program segments relative to the ends of the tape.

20 Claims, 4 Drawing Figures

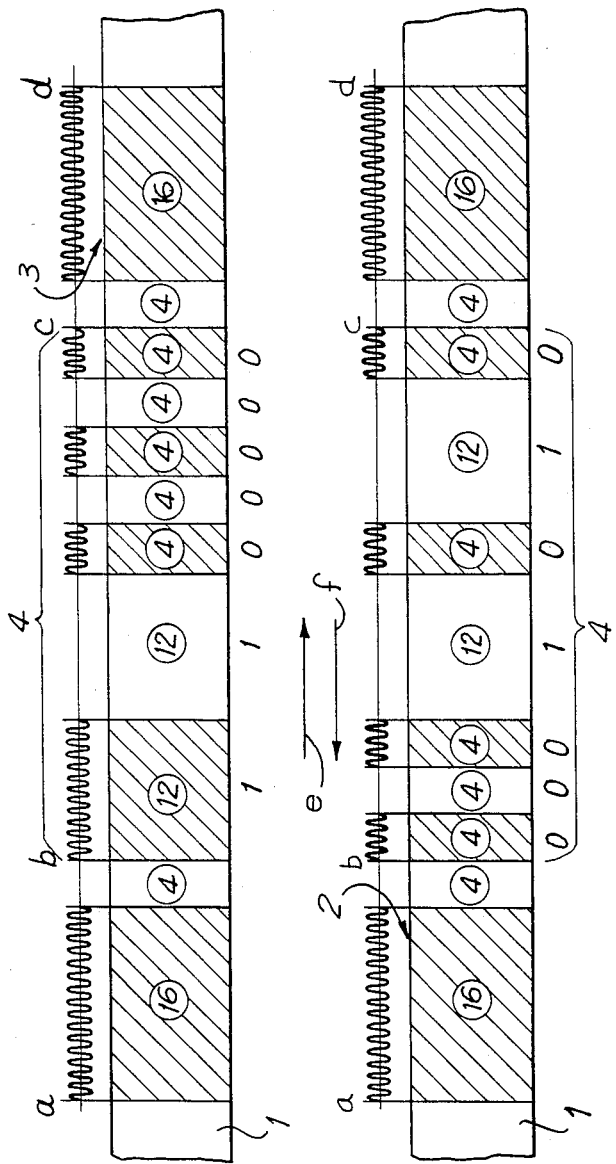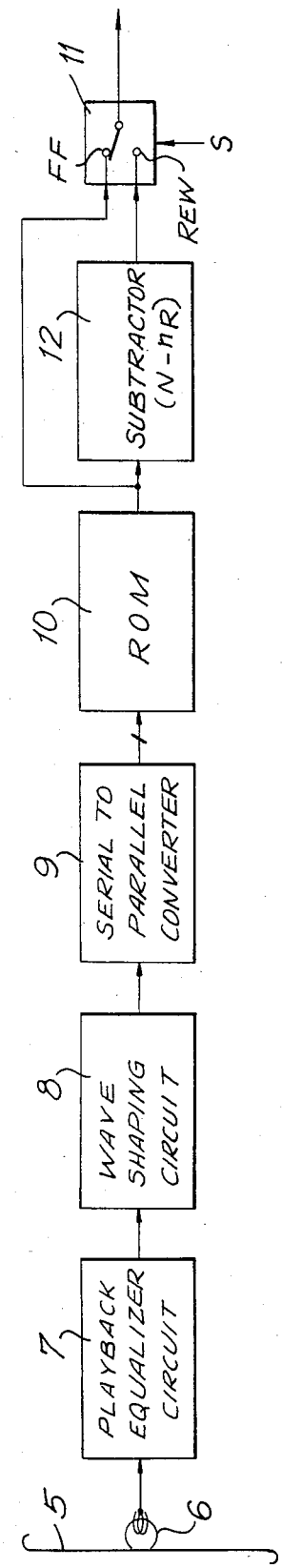

FIG. 3

| PROGRAM NUMBER | ADDRESS CODE | PROGRAM NUMBER | ADDRESS CODE |
|---|---|---|---|
| 1 | 1100000 | 11 | 0001100 |
| 2 | 1010000 | 12 | 0010010 |
| 3 | 1001000 | 13 | 0001010 |
| 4 | 1000100 | 14 | 0000110 |
| 5 | 1000010 | 15 | 0100001 |
| 6 | 0110000 | 16 | 0010001 |
| 7 | 0101000 | 17 | 0001001 |
| 8 | 0100100 | 18 | 0000101 |
| 9 | 0011000 | 19 | 0000011 |
| 10 | 0010100 | | |

METHOD AND APPARATUS FOR IDENTIFYING RECORDED INFORMATION SEGMENTS ON A RECORD MEDIUM

BACKGROUND OF THE INVENTION

1. Field of the Invention

This invention relates generally to a method and apparatus for locating program segments on a record medium and, more particularly, to a method and apparatus for recording and detecting address code signals separating program segments on a magnetic tape.

2. Description of the Prior Art

It is known to record on a magnetic tape a number of program selections, such as music or songs, with spaces or pauses in the sound therebetween. It has been proposed that address signals be included to distinguish each of the program segments, so that random access is possible to facilitate locating a desired program. If the address signals are recorded in the blank or silent portions between each of the program segments, then those address signals should not result in an audible signal when the tape player is in the playback mode. For this reason, it has been proposed to employ address signals having a specific frequency, for example, 20 Hz, which is out of the conventional audible frequency band, so as not to be reproduced as an audible sound. Additionally, such address signals must be provided so that the desired program segment can be located whether or not the player is in the fast forward or in the rewind mode.

One specific problem involved in this type of program segment identification in a tape player is the requirement for such tape players to employ playback equalization circuits. For example, if the address signals are recorded as continuous sine waves, for example, of 20 Hz, and during playback the output from the playback magnetic head is fed to a playback equalizer circuit, the output signal therefrom will be distorted because the time constant employed for equalization is limited in its effectiveness only to those frequencies in the audible frequency band. Therefore, when the low-frequency address signals are to be transformed to the actual address code indicating the location of the specific program segment, the distorted signals produced by the playback equalizer will be detected with an inherent error caused, for example, by harmonics of the low frequency address signals.

Another problem relating to identifying program segments recorded on a magnetic tape is the provision of suitable signals, such that the desired program segment can be accessed randomly from either direction, that is, that the desired program segment can be located whether or not the tape player is operating in the fast forward or in the rewind mode.

OBJECTS AND SUMMARY OF THE INVENTION

Accordingly, it is an object of the present invention to provide a method and apparatus for locating and identifying program segments along a magnetic tape that eliminates the above-noted defects inherent in the prior art.

Another object of the present invention is to provide a method and apparatus for recording address code signals that prevent any error occurring during detection of such recorded address code signals.

A further object of this invention is to provide a method and apparatus for recording address code signals in which the address code signals have a format easily readable whether the magnetic tape is running in the forward or in the reverse direction.

In accordance with one aspect of the present invention, in recording address signals on a magnetic tape the address signals are formed two different ways, the first being a burst signal having at least three continuous cycles or periods of a sine wave having a low frequency relative to the audio spectrum that is recorded along with a blank or absence of signal that has the same length as the first burst signal, and the second being a second burst signal having the same frequency as the first burst signal but which is recorded for more than two times the number of cycles or periods of the first burst signal and recorded along with the second burst signal is a blank or absence of signal having the same length as the second burst signal. The first and second burst signals and their attendant blank elements are recorded in specified arrangements in the unrecorded portions of the magnetic tape that exist between individual program segments. Also, either the first, second, or longer burst signal is recorded at both ends of the blank portion separating the program segments and, in this way, the location of the address code signals can be detected. The first burst signal and first blank can represent one level of a binary code and the second burst signal and its attendant blank can represent the other level of the binary code, that is, the bursts represent either a "1" or a "0".

The above, and other objects, features, and advantages of the present invention will become apparent from the following detailed description of illustrative embodiments thereof to be read in conjunction with the accompanying drawings.

BRIEF DESCRIPTION OF THE DRAWINGS

FIG. 1 schematically represents a portion of a magnetic tape in which inventive address code signals have been recorded in a first pattern according to the present invention;

FIG. 2 schematically represents a portion of a magnetic tape in which inventive address code signals have been recorded in a second pattern according to the present invention;

FIG. 3. is a table illustrating the relationship between the program segment numbers and corresponding address code signals, such as represented in FIGS. 1 and 2; and FIG. 4 is a block diagram illustrating an embodiment of a playback circuit for detecting the inventive address code signals.

DETAILED DESCRIPTION OF PREFERRED EMBODIMENT

FIG. 1 schematically represents a portion of a track on a magnetic tape and, specifically, that portion of the track which may exist between two prerecorded program segments. In this portion of the track the address code is provided following the method of the present invention. More specifically, in FIG. 1 the portions of track 1 which are shaded by oblique lines are those portions in which a sine wave signal having a constant frequency, for example, of 20 Hz, have been recorded. These areas between the recorded sine wave areas indicated by the oblique lines are blank areas, in which no signal is recorded. The prerecorded audio program segments are not shown in this portion of track 1 of the tape but exist to the left of point a and to the right of point d in track 1.

Because in following the teaching of the present invention the number of periods or cycles of the low-frequency sine waves recorded at the various locations provide the information necessary to determine the address of the various program segments, the exact number of sine wave cycles at each location is important. Thus, the encircled numerals 16, 12, and 4 appearing in track 1 indicate the exact number of complete sine wave cycles that have been recorded, or a period of time in which no signal is recorded that would be equivalent to the indicated number of complete sine wave cycles, at 20 Hz. In FIG. 1, the actual sine waves are represented above the shaded areas to indicate more clearly that the shaded areas contain a specified number of complete periods or cycles of these low-frequency sine waves. In the example of FIG. 1, at the ends of the area between points a and d, head signals 2 and 3 are recorded respectively, each containing sixteen complete sine waves, and these head signals delineate address code area 4 at which the address code signals are recorded. Thus, address code area 4 is that area existing between points b and c in track 1.

During operation then, when a magnetic head scans the magnetic tape in alignment with track 1 in the direction of arrow e, a head signal will be produced corresponding to the sine waves recorded in area 2 to indicate the beginning of the address code signal portion 4 and, similarly, another head signal will be produced by the sine waves recorded at area 3 to indicate the end of this address portion that exists between points a and d in track 1. Conversely, if a magnetic head were to scan track 1 in the direction shown at arrow f, the head signal produced by the sine waves at area 3 will indicate the beginning of the address portion and the head signal produced by the sine waves at area 2 would indicate the end of the address portion. In order to better delineate the address portion 4 from the head portions 2 and 3 blank areas corresponding in length to four cycles of the sine wave are arranged at the areas between the head signal portions 2 and 3 and address code signal portion 4 that is located between points b and c.

According to the present invention, the binary values or levels of the address code signal are determined by the corresponding lengths of the burst or blank signals recorded in address code signal portion 4. More specifically, in this embodiment a sine wave burst signal having twelve complete cycles or periods or a blank portion of the tape having a length corresponding to twelve sine waves represents one or the other of the two binary levels and, in this example, the twelve cycle length represents "1". When a burst signal is provided having four sine waves or a blank area is formed of a length equal to four sine waves, this represents the other one of the binary levels and, in this embodiment, the four cycle length represents "0". Accordingly, in FIG. 1, when a magnetic head scans track 1 on a magnetic tape in the direction of arrow e, a seven bit address code signal will be detected as "1100000". Conversely, when a magnetic head scans track 1 in a reverse direction, as represented by arrow f, the seven bit address code signal will be detected as "0000011".

It has been determined that the address code signals recorded in area 4 should have at least the following features: (1) a burst signal and a blank area should be recorded alternately; (2) there should exist a burst signal at each end of the area where the address signals are recorded; and (3) there should be at least two coded signals which indicate the level "1" within the seven bit addresss code signal.

FIG. 2 represents track 1 having a different address code recorded therein, that is, an address of another program segment different than that of FIG. 1. In the example of FIG. 2, the address code signal will be detected by a playback head scanning in the direction of arrow e as "0001010", and will be detected by such playback head scanning in the direction of arrow f as "0101000". Again, this address code is flanked on each end by head signal area 2 and 3 and the attendant respective blank spaces. Further, it is understood that this address code serves to identify a recorded program segment which is not seen in the portion of track 1 shown in FIG. 2.

The above-described method of the present invention should permit the address code signal recorded in area 4 on track 1 of the magnetic tape to be detected without any error, however, certain real-world problems are always present. Generally speaking, when a magnetic head scans a sine wave recorded on a magnetic tape, the output signal from the head will be a differentiation of the actual signal and, in this example, a signal having a cosine waveform will be produced. Typically, the playback equalization circuit integrates this differentiated signal so as to reproduce the original sine wave. One problem presented by the equalization circuit is that described above when the address code signals have a low frequency, such as 20 Hz, relative to the audio frequency band, the output signals from the playback equalization circuit generally are distorted. Moreover, close inspection of a burst formed of a series of continuous sine waves will reveal that the signal at both ends of this continuous sine wave has a low level and during playback this low level will approximate a signal dropout. Therefore, in this situation, the two individual sine waves that are recorded at the respective ends of every continuous sine wave burst will have inaccurate information, as represented by an apparent dropout, so that some error will be present when the address code signal is detected.

The present invention meets this problem by providing a method in which the burst signal in the address code signal area 4 always has at least four complete sine wave periods, so that even if the two individual sine waves at the respective ends of the burst signal appear as dropouts, at least the two central sine waves will remain to be positively detected. Furthermore, according to the method of the present invention, four continuous sine waves represent the binary level "0", and twelve continuous sine waves represent the binary level "1" thus, the level "1" can still be quite clearly distinguished from the level "0", even if the two individual sine waves at the respective ends of either the four or the twelve cycle sine wave bursts are dropped out.

Address code signals appearing in area 4 provided according to the present inventive method can be positively and accurately detected by a detecting circuit employing a clock signal and logic elements, for example, a microcomputer, following the three conditions described hereinabove. Initially, the level "1" or "0" can be determined by investigating the number of cycles or periods of the continuous sine waves that are present, since the burst signal exists first. Then, the binary level "1" or "0" can be determined by investigating how long the blank portion having no signal continues, since it is determined that the blank signals follow the burst signal. If signals are detected during this blank period then they can be easily judged as noise signals, because no signals should appear in this area on the track. Thus, by alternately investigating and checking for burst signals and blank signals and for the relative numbers of cycles or lengths or the blank portions, the seven bit address code signal can be detected.

In the embodiment of the invention described so far, a burst signal having twelve sine waves or a blank portion in the track being scanned having a length corresponding to twelve sine waves of the same frequency represents the binary level "1", and a burst signal having four sine waves or an attendant blank space having a length corresponding to four sine waves of the same frequency represents the binary level "0". Nevertheless, it has been determined that a burst signal having only three sine waves and another burst signal having more than six sine waves are sufficient to provide accurate detection of the address code signal. This is because the burst signal having the three sine waves can be detected and distinguished from a burst signal having six sine waves even if the two sine waves at both ends of these burst signals are dropped out. Various tests and experiments have been conducted with different ratios of burst signals or blank periods for the two binary values, and ratios such as three-to-six and four-to-eight have been found acceptable. Nevertheless, the preferred ratio has been determined as the four-to-twelve ratio described relative to the above embodiment.

Turning now to the specific binary code that will be utilized in area 4 in track 1 of the magnetic tape in order to identify the program segments, note that unless the code is entirely symmetrical a different code will be detected depending on the direction of scanning by the magnetic head. Generally, in tape players which reproduce address signals from a magnetic tape, one requirement is to display the program numbers that are obtained and transformed from the recorded address code signals during playback. Such program numbers can also be utilized for other operations in the tape player in addition to providing such visual display. In order to transform the detected address signals into the program numbers, typically a memory device is provided that contains all of the program numbers corresponding to all of the respective address code signals. Nevertheless, as stated above, because different address code signals will be detected depending upon the direction of scanning by the magnetic head, the memory device is required to have a capacity sufficient to memorize two times the number of actual address code signals provided, that is, an address for each direction.

In order to overcome this large memory requirement, the present invention provides a specific relationship between the address code signals and the program numbers that correspond to such address code signals, and one embodiment of such relationship is shown in FIG. 3. According to the table of FIG. 3, it is seen that the memory need only have a capacity large enough to memorize the number of different address code signals that correspond to the number of program segments actually recorded on the magnetic tape, and the requirement for a memory having two times such capacity is eliminated. The table of FIG. 3 is intended for an embodiment in which there are nineteen different program segments recorded on the magnetic tape, however, the present invention is not limited to this number or to any other number. In the table shown, if the address code signal corresponding to the program number for a specific program segment n is read out, starting at the left-most bit of the address code signal, this address code signal will equal another address code signal that is read out starting from the right-most bit, which corresponds to program segment number 20−n, where twenty is chosen as any whole number larger than the actual number of program segments recorded or to be recorded.

As an example, and referring now to FIG. 3, the address code for program number 4 is represented as "1000100" reading from left to right, and this address code signal is equal to another address code signal when read from right to left, that is, address code signal "0010001" which corresponds to program number 16 (20−4). Accordingly, the present invention teaches the use of specifically formulated address code signals so that when the tape track is being scanned in the normal direction or forward direction, as represented by arrow e in FIGS. 1 and 2, the address code signal that will be read out starting at the left-most bit when transformed will be program number n and will correspond to the correct number of the program segment. When the magnetic tape track is being scanned in the reverse direction, as represented by arrow f in FIGS. 1 and 2, which corresponds to the rewind direction, the address code signal will be read out starting at the right-most bit and the transformed program number n should be calculated using the formula 20−n in order to arrive at the correct number of the program segment. As another example, the program number 4 is detected when the tape is feeding in the forward direction, however, the program number 16 would be detected when the tape is feeding in the reverse direction and, thus, by means of the calculation (20−16) the correct number (4) of the program segment can be arrived at. The general formula for this is represented as follows:

$$n = n_F \qquad (1)$$

$$n = N - n_R \qquad (2)$$

where: n is the correct number of the program segment; $n_F$ is the program number detected when the tape is scanned in the normal or forward direction; $n_R$ is the program number detected when the tape is scanned in the reverse or rewind direction; and N is the predetermined, whole-number constant that is larger than the total of all of the program segments recorded on the magnetic tape. In this embodiment for a tape having nineteen program segments, N is chosen as twenty.

As represented then in FIG. 3, except for the center track 10 which is at the mid-point of the 19 program segments, all of the address code signals will have a corresponding complementary address code signal, thereby forming complementary pairs of program numbers, such as program numbers 1 and 19, program numbers 2 and 18, and so forth.

As set forth above, one of the features of the present invention is the provision of two bits having the level or value of "1" in each address code signal, and this is provided as a minimum to permit narrow spaces or areas in between the program segments in the track. Nevertheless, if the blank space available between program segments in the track of the magnetic tape is longer, then it is possible to have more than three bits representing the binary level "1", within the seven bit address code signal. Accordingly, there could be several code patterns other than those shown, depending on the total number of program segments and the total number of bits utilized to make up a code address signal. In such cases, it is understood that the teachings and concepts of the present invention are applicable thereto, so long as the address code signals corresponding to a pair of complementary program numbers have mutually symmetrical patterns.

Referring now to FIG. 4, a playback circuit suitable for detecting address code signals recorded in keeping with the above is shown in block diagram form. Magnetic tape 5 has formed thereon at least one track, represented at 1 in FIGS. 1 and 2, so that the program segments and respective address code signals recorded thereon are reproduced by playback head 6 and fed through playback equalizing circuit 7, which was described hereinabove, to wave-shaping circuit 8. Waveshaping circuit 8 forms pulses having lengths corresponding to the number of continuous sine waves forming the information in the address code signal. The respective blank portions are also formed by the wave-shaping circuit that shapes and defines the information pulses of the address code signal. The address code signal having been transformed by the wave-shaping circuit 8 is fed to serial-to-parallel convertor 9 and the seven-bit parallel binary signal is then fed as address data to a read only memory (ROM). Read only memory 10 then provides the program number corresponding to the seven-bit address code signal. Because the present invention takes into account the fact that the tape will be driven or transported in the forward or rewind modes, switch circuit 11 is provided that operates in response to a control signal S so as to bring a movable contact, to which the output terminal is connected, into contact with a fixed terminal FF corresponding to the fast-forward tape drive or to bring the movable contact into contact with fixed terminal REW, which corresponds to the rewind or reverse direction of the tape drive. Thus, the program number as read out from read only memory 10 is fed directly to the fixed terminal FF and will be output from switch 11 in the fast forward mode, but will be fed through subtraction circuit 12 to perform the calculation $N - n_R$, which as described above is necessary in order to arrive at the correct program number when the tape is being transported in the reverse or rewind direction. The output from subtraction circuit 12 is fed to the fixed terminal REW in switch 11 so that it is connected to the movable contact of switch 11, which is moved when control signal S indicates a reverse direction operation, and the output signal from switch 11 will have the subtraction operation performed thereto. Thus, it is seen that read only memory 10 need have a memory capacity sufficient to contain only that number of programs actually on the tape, such numbers then being accessed by the respective address code signals fed in from the serial-to-parallel convertor.

Although illustrative embodiments of the present invention have been described in detail above with reference to the accompanying drawings, it is to be understood that the invention is not limited to those precise embodiments, and that various changes and modifications can be effected therein by one skilled in the art without departing from the scope or spirit of the invention, as defined by the appended claims.

What is claimed is:

1. A method of recording address signals on a magnetic tape, for use in identifying respective program segments on said magnetic tape, in spaces arranged between the program segments, comprising the steps of:

providing a first burst signal having a first number of continuous sine waves of low frequency relative to the audio frequency band and a first blank signal having a length equal to said first burst signal, each representing the same one level of a binary signal;

providing a second burst signal having a second number of continuous sine waves of said low frequency, said second number being at least two times said first number, and a second blank signal having a length equal to said second burst signal, each representing the same other level of a binary signal;

arranging a plurality of said first burst signals and said first blank signals and said second burst signals and said second blank signals in a binary code pattern for each respective program segment, in which said step of arranging includes the step of assuring that a blank signal is always adjacent a burst signal in said binary code pattern; and recording said binary code pattern in said space on said magnetic medium adjacent the respective program segment, whereby said respective program segment is identified by said binary code pattern recorded on said magnetic tape.

2. The method according to claim 1, in which said first burst signal and said first blank signal each represent a binary "0" and said second burst signal and said second blank signal each represent a binary "1", and in which said step of arranging a plurality of said first and second burst signals and blank signals includes the step of selecting the total number of said second burst signals and blank signals to be less than the total number of said first burst signals and blank signals.

3. The method according to claim 1, in which said step of providing a first burst signal includes the step of forming said first burst having four complete continuous sine wave cycles.

4. The method according to claim 1, in which said step of providing said second burst signal includes the step of forming said second burst signal having twelve complete continuous sine wave cycles.

5. The method according to claim 1, including the further steps of providing a head burst element including a third burst signal having a third number of continuous sine waves of said low-frequency; arranging one head burst element at each end of said binary code pattern, so as to have a blank signal adjacent thereto; and recording said head burst elements along with said binary code pattern on said magnetic tape.

6. The method according to claim 5, in which said step of providing said head burst element includes the further step of forming said head burst element having a number of continuous sine waves at least equal to said second burst signal.

7. The method according to claim 1, in which said step of arranging said plurality of first and second burst signals and blank signals includes the further step of selecting said binary-code pattern for each respective program segment as complementary pairs corresponding to pairs of said program segments located equidistant from ends of said magnetic tape.

8. A method of recording address code signals on a magnetic tape for identifying each of a number of program segments thereof, in which the address code signals have a low frequency relative to the audio frequency band and are formed as a first burst signal made up of a number of continuous sine waves and a corresponding first blank portion of the same length as the first burst signal and a second burst signal made up of more than two times the number of continuous sine wave cycles as the first burst signal and a corresponding second blank portion of the same length as the second burst signal, comprising the steps of:

selecting said first burst signal and said first blank portion to each represent the same one level of a binary signal and said second burst signal and said second blank portion to each represent the same other level of the binary signal;

arranging a plurality of said first burst signals and first blank portions and said second burst signals and second blank portions in a different binary-code pattern for each respective program segment, in which said step of arranging includes the step of assuring that a blank signal is always adjacent a burst signal in said binary code pattern; and recording one of said binary-code pattern in a space on said magnetic tape adjacent the respective program segment, whereby said respective program segment is identified by said recorded binary code pattern.

9. The method according to claim 8, in which said step of selecting includes the steps of selecting said first burst signal and first blank portion to represent a binary "0" and selecting said second burst signal and said second blank portion to represent a binary "1" and in which said step of arranging a plurality of said first burst signal and first blank portion and second signal and second blank portion includes the step of choosing the total number of said second burst signals and second blank signals to be less than the total number of said first burst signals and first blank portions.

10. The method according to claim 8, including the further step of providing at least two head burst signals having a number of continuous sine waves greater than said number of sine waves in said second burst signal and arranging one of said head burst signals at either end of said binary code pattern for recording therewith on said magnetic medium.

11. The method according to claim 8, in which said step of arranging a plurality of said first burst signals and first blank portions and said second burst signals and second blank portions includes the step of forming said binary code pattern as complementary pairs corresponding to respective pairs of said program segments located equidistant from the ends of said magnetic tape.

12. A method for use in identifying respective program segments on a magnetic tape by recording address signals in spaces between the program segments, comprising the steps of:

providing a first burst signal having a first number of continuous sine waves of a low frequency relative to the audio frequency band and a first blank signal having a length equal to said fist burst signal, each representing one level of a binary signal;

providing a second burst signal having a second number of continuous sine waves of said low frequency said second number being at least two times said first number, and a second blank signal having a length equal to said second burst signal, each representing the other level of a binary signal;

arranging a plurality of said first burst signals and said first blank signals and said second burst signals and said second blank signals in a binary code pattern for each respective program segment, such that a blank signal is always adjacent a burst signal;

providing a head burst element including a third burst signal having a first number of continuous sine waves of said low-frequency;

arranging one head burst element at each end of said binary code pattern, so as to have a blank signal adjacent thereto; and recording said binary code pattern and the head burst elements in said space on said magnetic medium adjacent the respective program segment, whereby said respective program segment is identified by said binary code pattern recorded on said magnetic tape.

13. The method according to claim 12, in which said first burst signal and said first blank signal each represent a binary "0" and said second burst signal and said second blank signal each represent a binary "1", and in which said step of arranging a plurality of said first and second burst signals and blank signals includes the step of selecting the total number of said second burst signals and blank signals to be less than the total number of said first burst signals and blank signals.

14. The method according to claim 12, in which said step of providing a first burst signal includes the step of forming said first burst having four complete continuous sine wave cycles.

15. The method according to claim 12, in which said step of providing said second burst signal includes the step of forming said second burst signal having twelve complete continuous sine wave cycles.

16. The method according to claim 12, in which said step of providing said head burst element includes the further step of forming said head burst element having a number of continuous sine waves at least equal to the number of continuous sine wave cyles in said second burst signal.

17. The method according to claim 12, in which said step of arranging said plurality of first and second burst signals and blank signals includes the further step of selecting said binary-code pattern for each respective program segment as complementary pairs corresponding to pairs of said program segments located equidistant from ends of said magnetic tape.

18. A method of recording address code signals on a magnetic tape for identifying each of a number of program segments thereof, in which the address code signals have a low frequency relative to the audio frequency band and are formed as a first burst signal made up of a number of continuous sine waves and a corresponding first blank portion of the same length as the first burst signal and a second burst signal made up of more than two times the number of continuous sine wave cyles as the first burst signal and a corresponding second blank portion of the same length as the second burst signal, the method comprising the steps of:

selecting said first burst signal and said first blank portion to each represent one level of a binary signal and said second burst signal and said second blank portion to each represent the other level of the binary signal;

arranging a plurality of said first burst signals and first blank portions and said second burst signals and second blank portions in a different binary-code pattern for each respective program segment such that a blank signal is always adjacent a burst signal;

providing at least two head burst signal having a number of continuous sine waves greater than said number of sine waves in said second burst signal;

arranging one of said head burst signals at either end of said binary code pattern for recording therewith on said magnetic medium; and recording one of said binary-code patterns and a head burst signal in a space on said magnetic tape adjacent the respective program segment, whereby said respective program segment is identified by said recorded binary code pattern.

19. The method according to claim 16, in which said step of selecting includes the steps of selecting said first burst signal and first blank portion to represent a binary "0" and selecting said second burst signal and said second blank portion to represent a binary "1" and in which said step of arranging a plurality of said first burst signals and first blank portions and second burst signals and second blank portions includes the step of choosing the total number of said second burst signals and second blank signals to be less than the total number of said first burst signals and first blank portions.

20. The method according to claim 18, in which said step of arranging a plurality of said first burst signals and first blank portions and said second burst signals and second blank portions includes the step of forming said binary code pattern as complementary pairs corresponding to respective pairs of said program segments located equidistant from the ends of said magnetic tape.

* * * * *